(12) United States Patent
Parish et al.

(10) Patent No.: US 10,467,315 B2
(45) Date of Patent: Nov. 5, 2019

(54) CODELESS SHARING OF SPREADSHEET OBJECTS

(71) Applicant: Microsoft Technology Licensing, LLC, Redmond, WA (US)

(72) Inventors: Daniel Parish, Kirkland, WA (US); Daniel Battagin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 15/643,147

(22) Filed: Jul. 6, 2017

(65) Prior Publication Data

US 2017/0308617 A1 Oct. 26, 2017

Related U.S. Application Data

(63) Continuation of application No. 12/964,633, filed on Dec. 9, 2010, now Pat. No. 9,721,030.

(51) Int. Cl.
| | | |
|---|---|---|
| *G06F 3/048* | (2013.01) | |
| *G06F 16/955* | (2019.01) | |
| *G06F 17/24* | (2006.01) | |
| *G06Q 50/00* | (2012.01) | |
| *G06Q 10/10* | (2012.01) | |
| *G06F 3/0481* | (2013.01) | |

(52) U.S. Cl.
CPC .......... *G06F 16/955* (2019.01); *G06F 17/246* (2013.01); *G06Q 10/101* (2013.01); *G06Q 50/01* (2013.01); *G06F 3/0481* (2013.01)

(58) Field of Classification Search
CPC .......................................... G06F 3/0481–0489
See application file for complete search history.

(56) References Cited

U.S. PATENT DOCUMENTS

| | | | |
|---|---|---|---|
| 4,885,681 | A | 12/1989 | Umeno |
| 5,497,283 | A | 3/1996 | Kato |
| 5,553,215 | A | 9/1996 | Kaethler |

(Continued)

FOREIGN PATENT DOCUMENTS

| | | | |
|---|---|---|---|
| CN | 1770121 | A | 5/2006 |
| CN | 1791871 | A | 6/2006 |

(Continued)

OTHER PUBLICATIONS

"Office Action Issued in Korean Patent Application No. 10-2013-7014699", dated Mar. 29, 2018, 9 pages.

(Continued)

*Primary Examiner* — Steven B Theriault (57) ABSTRACT

A user interface that when selected triggers the automatic sharing of a spreadsheet object in a spreadsheet with a chosen network service (e.g. social network, blog, or some other network location). For example, cells, tables, charts and other objects of the spreadsheet may be selected to be shared using the user interface. When a spreadsheet object is selected and indicated to be shared using the user interface, the spreadsheet is automatically saved to a network share, permissions are set for the spreadsheet to share the spreadsheet object, and the spreadsheet object is shared with the network service. Changes made to the spreadsheet after the spreadsheet object is shared are reflected in the spreadsheet object on the network service.

20 Claims, 4 Drawing Sheets

(56) References Cited

U.S. PATENT DOCUMENTS

| | | | |
|---|---|---|---|
| 5,675,782 A * | 10/1997 | Montague | G06F 21/604 |
| | | | 707/999.01 |
| 5,835,910 A | 11/1998 | Kavanagh et al. | |
| 5,857,211 A | 1/1999 | Carper et al. | |
| 5,913,032 A | 6/1999 | Schwartz | |
| 5,983,268 A | 11/1999 | Freivald et al. | |
| 6,157,934 A | 12/2000 | Khan et al. | |
| 6,212,382 B1 | 4/2001 | Watson et al. | |
| 6,243,824 B1 | 6/2001 | Kakuta et al. | |
| 6,385,770 B1 | 5/2002 | Sinander | |
| 6,453,325 B1 | 9/2002 | Cabrera et al. | |
| 6,453,824 B1 | 9/2002 | Dobbins | |
| 6,571,283 B1 | 5/2003 | Smorodinsky | |
| 6,572,662 B2 | 6/2003 | Manohar et al. | |
| 6,578,054 B1 | 6/2003 | Hopmann | |
| 6,613,098 B1 | 9/2003 | Sorge et al. | |
| 6,654,746 B1 | 11/2003 | Wong et al. | |
| 6,675,226 B1 | 1/2004 | Nair et al. | |
| 6,701,485 B1 * | 3/2004 | Igra | G06F 17/246 |
| | | | 715/209 |
| 6,711,593 B1 | 3/2004 | Gordon | |
| 6,738,799 B2 | 5/2004 | Dickenson | |
| 6,823,384 B1 | 11/2004 | Wilson et al. | |
| 6,898,727 B1 | 5/2005 | Wang et al. | |
| 6,912,690 B2 | 6/2005 | Bauchot | |
| 6,934,848 B1 | 8/2005 | King et al. | |
| 6,983,311 B1 | 1/2006 | Haitsuka et al. | |
| 6,988,241 B1 | 1/2006 | Guttman et al. | |
| 7,000,228 B2 | 2/2006 | Mortazavi | |
| 7,035,926 B1 | 4/2006 | Cohen et al. | |
| 7,043,737 B1 | 5/2006 | Uvez et al. | |
| 7,047,484 B1 | 5/2006 | Becker et al. | |
| 7,200,804 B1 | 4/2007 | Khavari et al. | |
| 7,225,189 B1 | 5/2007 | McCormack et al. | |
| 7,233,951 B1 | 6/2007 | Gainer et al. | |
| 7,251,776 B2 | 7/2007 | Handsaker et al. | |
| 7,325,156 B1 | 1/2008 | Scholss et al. | |
| 7,360,208 B2 | 4/2008 | Joshi | |
| 7,363,382 B1 | 4/2008 | Bakke | |
| 7,430,709 B2 | 9/2008 | Cho et al. | |
| 7,454,471 B2 | 11/2008 | Sorge et al. | |
| 7,454,659 B1 | 11/2008 | Thomas et al. | |
| 7,463,648 B1 | 12/2008 | Eppstein et al. | |
| 7,480,773 B1 | 1/2009 | Reed | |
| 7,506,243 B2 | 3/2009 | Kotler et al. | |
| 7,516,367 B1 | 4/2009 | Beltowski et al. | |
| 7,533,118 B2 | 5/2009 | Chaudri | |
| 7,555,751 B1 | 6/2009 | Abbavaram | |
| 7,577,661 B2 | 8/2009 | Bankston | |
| 7,668,961 B2 | 2/2010 | Lomet | |
| 7,680,848 B2 | 3/2010 | Janeditakarn | |
| 7,680,933 B2 | 3/2010 | Fatula, Jr. | |
| 7,681,116 B2 | 3/2010 | Sorge et al. | |
| 7,720,820 B2 | 5/2010 | Lomet | |
| 7,721,303 B2 * | 5/2010 | Alves de Moura | G06F 8/38 |
| | | | 719/328 |
| 7,734,723 B2 | 6/2010 | Bedi et al. | |
| 7,752,536 B2 | 7/2010 | Megiddo et al. | |
| 7,756,824 B2 | 7/2010 | Campbell et al. | |
| 7,779,431 B2 | 8/2010 | Wallace | |
| 7,783,980 B1 | 8/2010 | Herold | |
| 7,823,145 B1 | 10/2010 | Le et al. | |
| 7,840,911 B2 | 11/2010 | Milener et al. | |
| 7,962,709 B2 | 6/2011 | Agrawal | |
| 7,991,798 B2 | 8/2011 | Arora | |
| 7,991,804 B2 | 8/2011 | Battagin et al. | |
| 8,046,403 B2 | 10/2011 | Mazzaferri | |
| 8,103,906 B1 | 1/2012 | Alibakhsh et al. | |
| 8,108,779 B1 | 1/2012 | Rein et al. | |
| 8,140,958 B2 * | 3/2012 | Garrett | G06F 16/2308 |
| | | | 715/212 |
| 8,151,358 B1 | 4/2012 | Herold | |
| 8,185,897 B2 | 5/2012 | Kushwaha | |
| 8,190,987 B2 * | 5/2012 | Campbell | G06F 17/246 |
| | | | 715/212 |
| 8,239,348 B1 | 8/2012 | Bezbaruah et al. | |
| 8,250,170 B2 | 8/2012 | Stuckman et al. | |
| 8,255,791 B2 | 8/2012 | Koren | |
| 8,261,268 B1 | 9/2012 | Forgette | |
| 8,275,974 B2 | 9/2012 | Voshell | |
| 8,296,267 B2 | 10/2012 | Cahill et al. | |
| 8,301,588 B2 | 10/2012 | Kannan et al. | |
| 8,307,119 B2 | 11/2012 | Rochelle et al. | |
| 8,326,803 B1 | 12/2012 | Stringham | |
| 8,341,532 B2 * | 12/2012 | Ryan | G06Q 10/10 |
| | | | 715/751 |
| 8,359,594 B1 | 1/2013 | Davidson et al. | |
| 8,370,317 B2 | 2/2013 | Chen et al. | |
| 8,370,423 B2 | 2/2013 | Ozzie et al. | |
| 8,380,667 B2 | 2/2013 | Driesen | |
| 8,386,501 B2 | 2/2013 | Cahill et al. | |
| 8,417,737 B2 | 4/2013 | Hopmann et al. | |
| 8,464,161 B2 * | 6/2013 | Giles | G06F 21/604 |
| | | | 345/419 |
| 8,543,926 B2 * | 9/2013 | Giles | G06Q 10/10 |
| | | | 345/419 |
| 8,578,399 B2 | 11/2013 | Khen et al. | |
| 8,656,290 B1 * | 2/2014 | Greenspan | G06F 3/0481 |
| | | | 707/608 |
| 8,676,845 B2 | 3/2014 | Bender | |
| 8,701,103 B1 | 4/2014 | Hsu | |
| 8,713,038 B2 | 4/2014 | Cohen et al. | |
| 8,751,656 B2 | 6/2014 | Cahill et al. | |
| 8,756,196 B2 | 6/2014 | Bostick et al. | |
| 8,799,453 B2 | 8/2014 | Cahill et al. | |
| 8,850,550 B2 | 9/2014 | Dalzell et al. | |
| 9,015,177 B2 | 4/2015 | Cahill et al. | |
| 9,043,370 B2 | 5/2015 | Hopmann et al. | |
| 9,075,661 B2 | 7/2015 | Hopmann et al. | |
| 9,721,030 B2 | 8/2017 | Parish et al. | |
| 2001/0056554 A1 | 12/2001 | Chrabaszcz | |
| 2002/0010743 A1 * | 1/2002 | Ryan | G06F 17/246 |
| | | | 709/205 |
| 2002/0010746 A1 | 1/2002 | Ryan et al. | |
| 2002/0078074 A1 | 6/2002 | Cho et al. | |
| 2002/0078233 A1 | 6/2002 | Biliris et al. | |
| 2002/0129054 A1 | 9/2002 | Ferguson et al. | |
| 2002/0129106 A1 * | 9/2002 | Gutfreund | G06Q 10/10 |
| | | | 709/205 |
| 2002/0161814 A1 | 10/2002 | Wical | |
| 2002/0162049 A1 | 10/2002 | Takamoto et al. | |
| 2002/0169799 A1 | 11/2002 | Voshell | |
| 2003/0005133 A1 | 1/2003 | Banerjee et al. | |
| 2003/0061365 A1 | 3/2003 | White | |
| 2003/0126229 A1 | 7/2003 | Kantor et al. | |
| 2003/0154278 A1 | 8/2003 | Hirschman et al. | |
| 2003/0154279 A1 | 8/2003 | Aziz | |
| 2003/0193558 A1 | 10/2003 | Doss et al. | |
| 2003/0204460 A1 | 10/2003 | Robinson et al. | |
| 2003/0221190 A1 | 11/2003 | Deshpande et al. | |
| 2004/0024881 A1 | 2/2004 | Elving et al. | |
| 2004/0111636 A1 | 5/2004 | Baffes et al. | |
| 2004/0133619 A1 | 7/2004 | Zelig | |
| 2004/0143662 A1 | 7/2004 | Poyhonen | |
| 2004/0205168 A1 * | 10/2004 | Asher | H04L 29/06 |
| | | | 709/220 |
| 2004/0205765 A1 | 10/2004 | Beringer et al. | |
| 2004/0210623 A1 | 10/2004 | Hydrie | |
| 2004/0237045 A1 | 11/2004 | Meltzer | |
| 2005/0028008 A1 * | 2/2005 | Kumar | G06F 21/6227 |
| | | | 726/2 |
| 2005/0044486 A1 | 2/2005 | Kotler et al. | |
| 2005/0050076 A1 | 3/2005 | Tong et al. | |
| 2005/0060397 A1 | 3/2005 | Barthram et al. | |
| 2005/0132382 A1 | 6/2005 | McGuire et al. | |
| 2005/0138566 A1 | 6/2005 | Muller et al. | |
| 2005/0198325 A1 * | 9/2005 | Holland | G06F 17/2288 |
| | | | 709/229 |
| 2006/0015806 A1 * | 1/2006 | Wallace | G06F 17/246 |
| | | | 715/229 |
| 2006/0015932 A1 | 1/2006 | Ballinger | |

(56) References Cited

U.S. PATENT DOCUMENTS

| | | |
|---|---|---|
| 2006/0015933 A1 | 1/2006 | Ballinger et al. |
| 2006/0031268 A1 | 2/2006 | Shutt et al. |
| 2006/0041554 A1* | 2/2006 | Svendsen ............ G06F 16/9574 |
| 2006/0070020 A1 | 3/2006 | Puttaswamy et al. |
| 2006/0075076 A1 | 4/2006 | Sinha |
| 2006/0080596 A1* | 4/2006 | Bhogal .................. G06F 9/542 |
| | | 715/213 |
| 2006/0085785 A1 | 4/2006 | Garrett |
| 2006/0095447 A1 | 5/2006 | Dickinson et al. |
| 2006/0122469 A1 | 6/2006 | Martel |
| 2006/0123119 A1 | 6/2006 | Hill |
| 2006/0129809 A1 | 6/2006 | Battagin et al. |
| 2006/0149789 A1 | 7/2006 | Sorge et al. |
| 2006/0168218 A1 | 7/2006 | Kashyap |
| 2006/0190698 A1 | 8/2006 | Mizuno |
| 2006/0224946 A1 | 10/2006 | Barrett et al. |
| 2006/0248443 A1 | 11/2006 | Bagheri |
| 2006/0271395 A1 | 11/2006 | Harris |
| 2006/0274695 A1 | 12/2006 | Krishnamurthi et al. |
| 2006/0277224 A1 | 12/2006 | Aftab et al. |
| 2007/0005769 A1 | 1/2007 | Ammerlann |
| 2007/0011042 A1* | 1/2007 | Kim ....................... G06Q 10/10 |
| | | 707/600 |
| 2007/0043860 A1 | 2/2007 | Pabari |
| 2007/0050415 A1 | 3/2007 | Armangau et al. |
| 2007/0073882 A1 | 3/2007 | Brown et al. |
| 2007/0078852 A1 | 4/2007 | Chen et al. |
| 2007/0086476 A1 | 4/2007 | Iglesias et al. |
| 2007/0130566 A1 | 6/2007 | van Rietschote |
| 2007/0169189 A1 | 7/2007 | Crespo et al. |
| 2007/0186068 A1 | 8/2007 | Agrawal |
| 2007/0192304 A1 | 8/2007 | Iyer et al. |
| 2007/0198554 A1 | 8/2007 | Liu |
| 2007/0204325 A1 | 8/2007 | Cameron et al. |
| 2007/0214455 A1 | 9/2007 | Williams et al. |
| 2007/0219956 A1* | 9/2007 | Milton .................. G06F 17/246 |
| 2007/0220415 A1* | 9/2007 | Cheng .................. G06F 17/246 |
| | | 715/212 |
| 2007/0233811 A1* | 10/2007 | Rochelle .............. G06F 17/246 |
| | | 709/219 |
| 2007/0240161 A1 | 10/2007 | Prabhakar et al. |
| 2007/0245235 A1 | 10/2007 | Singh et al. |
| 2007/0260644 A1 | 11/2007 | Ljungqvist |
| 2007/0261049 A1 | 11/2007 | Bankston et al. |
| 2007/0271560 A1 | 11/2007 | Wahlert et al. |
| 2007/0285501 A1 | 12/2007 | Yim |
| 2008/0028287 A1 | 1/2008 | Handsaker et al. |
| 2008/0059539 A1* | 3/2008 | Chin ....................... G06Q 10/10 |
| 2008/0065674 A1 | 3/2008 | Liu et al. |
| 2008/0077632 A1 | 3/2008 | Tysowski et al. |
| 2008/0082560 A1 | 4/2008 | Agrawal et al. |
| 2008/0098046 A1 | 4/2008 | Alpern |
| 2008/0120351 A1 | 5/2008 | Khaladkar et al. |
| 2008/0126428 A1 | 5/2008 | Swanburg |
| 2008/0126580 A1 | 5/2008 | Tripathi |
| 2008/0147753 A1 | 6/2008 | Chasman |
| 2008/0154915 A1 | 6/2008 | Iwatsu et al. |
| 2008/0154918 A1 | 6/2008 | Iwatsu et al. |
| 2008/0155023 A1 | 6/2008 | Kadashevich |
| 2008/0189468 A1 | 8/2008 | Schmidt |
| 2008/0189700 A1 | 8/2008 | Schmidt |
| 2008/0243763 A1 | 10/2008 | Bishop et al. |
| 2008/0243867 A1 | 10/2008 | Akezyt |
| 2008/0244184 A1 | 10/2008 | Lewis |
| 2008/0256607 A1 | 10/2008 | Janedittakarn |
| 2008/0263534 A1 | 10/2008 | Hirsave et al. |
| 2008/0270459 A1 | 10/2008 | Grewal |
| 2008/0270564 A1 | 10/2008 | Rangegowda |
| 2008/0270706 A1 | 10/2008 | Fair et al. |
| 2008/0289020 A1 | 11/2008 | Cameron et al. |
| 2009/0018999 A1 | 1/2009 | Petri |
| 2009/0049056 A1 | 2/2009 | Shutt et al. |
| 2009/0059952 A1* | 3/2009 | Kalofonos ........... H04L 63/0227 |
| | | 370/465 |
| 2009/0083561 A1 | 3/2009 | Kaburlasos et al. |
| 2009/0089067 A1 | 4/2009 | Campbell et al. |
| 2009/0100058 A1* | 4/2009 | Faitelson ............ G06F 21/6218 |
| 2009/0100419 A1 | 4/2009 | Childress et al. |
| 2009/0113109 A1 | 4/2009 | Nelson et al. |
| 2009/0113442 A1 | 4/2009 | Deidda et al. |
| 2009/0158176 A1 | 6/2009 | Kalaboukis et al. |
| 2009/0164621 A1 | 6/2009 | Kothari |
| 2009/0172553 A1 | 7/2009 | Sikka et al. |
| 2009/0199177 A1 | 8/2009 | Edwards |
| 2009/0216789 A1 | 8/2009 | Chowdhary et al. |
| 2009/0216855 A1 | 8/2009 | Lang et al. |
| 2009/0216975 A1 | 8/2009 | Halperin et al. |
| 2009/0228485 A1 | 9/2009 | Handy et al. |
| 2009/0228589 A1 | 9/2009 | Korupolu |
| 2009/0228950 A1 | 9/2009 | Reed |
| 2009/0248756 A1 | 10/2009 | Akidau et al. |
| 2009/0260055 A1* | 10/2009 | Parmar .................. H04L 63/102 |
| | | 726/1 |
| 2009/0293022 A1 | 11/2009 | Fries |
| 2009/0293056 A1 | 11/2009 | Ferris |
| 2009/0313299 A1* | 12/2009 | Bonev .................. G06Q 10/109 |
| 2009/0327139 A1 | 12/2009 | Shah |
| 2009/0327294 A1 | 12/2009 | Bailor et al. |
| 2010/0011315 A1 | 1/2010 | Araki |
| 2010/0011409 A1 | 1/2010 | Hodgkinson |
| 2010/0027552 A1 | 2/2010 | Hill |
| 2010/0049668 A1 | 2/2010 | Lynn et al. |
| 2010/0058349 A1 | 3/2010 | Diwakar et al. |
| 2010/0070466 A1 | 3/2010 | Anand et al. |
| 2010/0077165 A1 | 3/2010 | Lu et al. |
| 2010/0082860 A1 | 4/2010 | Murthy |
| 2010/0083253 A1 | 4/2010 | Kushwaha |
| 2010/0095198 A1 | 4/2010 | Bultrowicz et al. |
| 2010/0106812 A1 | 4/2010 | Bernabeu-Auban |
| 2010/0107162 A1 | 4/2010 | Edwards et al. |
| 2010/0113159 A1 | 5/2010 | Chapman et al. |
| 2010/0121902 A1 | 5/2010 | Ramanathan et al. |
| 2010/0125612 A1 | 5/2010 | Amradkar |
| 2010/0145861 A1 | 6/2010 | Law et al. |
| 2010/0146290 A1 | 6/2010 | Bachmann |
| 2010/0161752 A1* | 6/2010 | Collet ................... H04L 67/104 |
| | | 709/216 |
| 2010/0162226 A1 | 6/2010 | Borissov |
| 2010/0179941 A1 | 7/2010 | Agrawal et al. |
| 2010/0192143 A1 | 7/2010 | Ingle |
| 2010/0205227 A1 | 8/2010 | Weissman et al. |
| 2010/0205520 A1* | 8/2010 | Parish .................. G06F 17/246 |
| | | 715/212 |
| 2010/0211548 A1 | 8/2010 | Ott et al. |
| 2010/0211619 A1 | 8/2010 | Weissman et al. |
| 2010/0251242 A1 | 9/2010 | Sivasubramanian et al. |
| 2010/0251339 A1 | 9/2010 | MacDonald |
| 2010/0262632 A1 | 10/2010 | Jain |
| 2010/0275222 A1 | 10/2010 | Wallace |
| 2010/0287359 A1 | 11/2010 | Norden |
| 2010/0312810 A1 | 12/2010 | Horton et al. |
| 2011/0016379 A1* | 1/2011 | McColl ................ G06F 17/246 |
| | | 715/219 |
| 2011/0022642 A1 | 1/2011 | deMilo et al. |
| 2011/0035421 A1* | 2/2011 | Laird-McConnell ...................... |
| | | H04L 67/02 |
| | | 707/822 |
| 2011/0071856 A1 | 3/2011 | Nasenbenny et al. |
| 2011/0072486 A1 | 3/2011 | Hader et al. |
| 2011/0078113 A1 | 3/2011 | Franz |
| 2011/0083167 A1* | 4/2011 | Carpenter ............... H04L 67/10 |
| | | 726/4 |
| 2011/0087954 A1 | 4/2011 | Dickerman et al. |
| 2011/0138049 A1* | 6/2011 | Dawson ................. G06F 9/451 |
| | | 709/226 |
| 2011/0138391 A1 | 6/2011 | Cho et al. |
| 2011/0145439 A1* | 6/2011 | Chaturvedi ........... G06F 9/5027 |
| | | 709/244 |
| 2011/0161964 A1 | 6/2011 | Piazza et al. |
| 2011/0173303 A1 | 7/2011 | Rider |
| 2011/0209048 A1 | 8/2011 | Scott et al. |

(56) References Cited

U.S. PATENT DOCUMENTS

| | | | |
|---|---|---|---|
| 2011/0307791 A1* | 12/2011 | Pierre | G06F 16/9535 715/736 |
| 2012/0101983 A1 | 4/2012 | Hopmann et al. | |
| 2012/0101998 A1 | 4/2012 | Cahill et al. | |
| 2012/0102067 A1 | 4/2012 | Cahill et al. | |
| 2012/0102198 A1 | 4/2012 | Cahill et al. | |
| 2012/0102199 A1 | 4/2012 | Hopmann et al. | |
| 2012/0102480 A1 | 4/2012 | Hopmann et al. | |
| 2012/0102494 A1 | 4/2012 | Cahill et al. | |
| 2012/0102506 A1 | 4/2012 | Hopmann et al. | |
| 2012/0131660 A1 | 5/2012 | Dalzell et al. | |
| 2012/0136941 A1 | 5/2012 | Howes et al. | |
| 2012/0151378 A1 | 6/2012 | Parish et al. | |
| 2013/0124481 A1 | 5/2013 | Cahill et al. | |
| 2013/0159344 A1 | 6/2013 | Cahill et al. | |
| 2013/0226973 A1 | 8/2013 | Hopmann et al. | |
| 2014/0033009 A1 | 1/2014 | Rein et al. | |
| 2014/0337502 A1 | 11/2014 | Cahill et al. | |
| 2015/0317187 A1 | 11/2015 | Hopmann et al. | |

FOREIGN PATENT DOCUMENTS

| | | |
|---|---|---|
| CN | 1908934 A | 2/2007 |
| CN | 1989489 | 6/2007 |
| CN | 101162988 A | 4/2008 |
| CN | 101211312 A | 7/2008 |
| CN | 101410774 | 4/2009 |
| CN | 101426254 A | 5/2009 |
| CN | 101657804 | 2/2010 |
| CN | 101765225 A | 6/2010 |
| CN | ZL 20111033894.3 | 6/2014 |
| EP | 1164502 A2 | 12/2001 |
| JP | S6-2219068 A | 9/1987 |
| JP | H-10162061 A | 6/1998 |
| KR | 10-0980599 | 9/2010 |
| RU | 2400811 C2 | 9/2010 |
| SG | 189412 | 6/2014 |
| SG | 189417 | 6/2014 |
| TW | I289986 B | 11/2007 |
| TW | I327002 B | 7/2010 |
| WO | WO 2010-090899 | 8/2010 |

OTHER PUBLICATIONS

Web Page, "Google Docs", Presentation insertion method in the Google document tool, cited as an Appendix to the Korean Office action noted above, http://dylanko.tistory.com/176, Nov. 8, 2010, 13 pages. (No English translation).

"Office Action and Search Report issued in Taiwan Application No. 100133628", dated Sep. 30, 2015, 8 Pages.

"Office Action Issued in European Application No. 11834944.8", dated Apr. 30, 2018, 6 Pages.

"First Office Action Issued in Chinese Application No. 201110339862. 3", dated Apr. 27, 2018, 13 Pages.

"Office Action Issued in Chinese Application No.", dated Apr. 27, 2018, 13 Pages.

December J, "Intro to Unix: Pipes and Filters", http://www.december.com/unix/tutor/pipesfilters.html, 2 Pages.

"Notice of Allowance Issued in South African Patent Application No. 2013/03417", dated May 14, 2014, 1 Page.

"Notice of Allowance Issued in Canadian Patent Application No. 2817623", dated Oct. 11, 2017, 1 Page.

U.S. Appl. No. 14/445,572, Office Action dated Oct. 16, 2017, 17 pgs.

"Supplementary Search Report Issued in European Patent Application No. 11846557.4", dated Dec. 15, 2017, 6 Pages.

Koike, et al., "Spreadsheet Interface Which Simplifies the Visualization of the Network Structures", In Proceedings of the International Conference on Knowledge-Based and Intelligent Information and Engineering Systems, Sep. 12, 2007, 8 Pages.

"Adopting Server Virtualization for Business Continuity and Disaster Recovery"; CA ARCserve Backup and CA Xosoft Replication and High Availability Software with Hyper-V Technology—A Powerful Combination; Published 2009; 17 pgs.

"BadBlue Excel Web Spreadsheet Collaboration Server 2.72b"; Published Apr. 20, 2010; http://badblue-excel-web-spreadsheet-collaboration-server.badblue.qarchive.org/; 2 pgs.

"Excel Services Overview (SharePoint Server 2010)"; Microsoft Corporation; Published May 12, 2010; http://technet.microsoft.com/en-us/library/ee424405.aspx; 3 pgs.

"HP Serviceguard Cluster Configuration for HP-UX 11i or Linux Partitioned Systems"; Apr. 2009; 13 pgs.

"IBM Director v6.2.x"; Retrieved Sep. 20, 2010; http://publib.boulder.ibm.com/infocenter/director/v6r2x/index.jsp?topic=/com.ibm.director.updates.helps.doc/fqm0_t_um_updating_systems.html; 2 pgs.

"LinkedCells 1.8 Description"; WareSeeker.com; Published Mar. 16, 2009; http://wareseeker.com/Business-Finance/linkedcells-1.8.zip/1f2ea4b9e; 3 pgs.

"Microsoft High Availability Overview White Paper"; Published Jan. 2008; 19 pgs.

"MySQL Cluster Features"; Retrieved Sep. 20, 2010; http://www.mysql.com/products/database/cluster/features.html; 5 pgs.

"RightGrid Basic Example"; Retrieved Sep. 24, 2010; http://support.rightscale.com/03-Tutorials/02-AWS/03-Grid_Edition/Basic_RightGrid_Example; 16 pgs.

"SAS Grid Computing"; SAS Institute; Retrieved Sep. 24, 2010; http://www.sas.com/technologies/architecture/grid/index.html; 2 pgs.

"Small to Medium Sized Data Center with Applogic Cloud"; Migrate to Cloud; Published Jul. 22, 2010; http://www.migrate2cloud.com/blog/small-to-medium-sized-date-center-with-applogic-cloud; 4 pgs.

"The NorduGrid Grid Manager and GridFTP Server"; Published Aug. 10, 2010; http://www.nordugrid.org/documents/GM-pdf; 37 pgs.

"Understanding SharePoint 2010 Claims Authentication"; Published May 27, 2010; http://blogs.msdn.com/b/russmax/archive/2010/05/27/ understanding-sharepoint-2010-claims-authentication.aspx; 5 pgs.

"Using Vmware vCenter Update Manager to Keep your vSphere Hosts Up-to-Date with Patching"; Published Feb. 9, 2010; http://www.simple-talk.com/sysadmin/virtualization/using-vmware-vcenter-update-manager-to-keep-your-vsphere-hosts-up-to-date-with-patching/; 10 pgs.

"Vmware Virtual Appliances"; Published Jan. 8, 2009; http://www.petri.co.il/virtual_vmware_virtual_appliances.htm; 2 pgs.

"XLCubed Web Edition"; Published 2009; http://xlcubed.com/en/web.html; 2 pgs.

"Zones Parallel Patching Feature Now Available"; Published Date Jun. 17, 2009; 1 pg.

Above the Cloud; "The Azure Fabric Controller"; Published Mar. 23, 2009; http://azure.snagy.name/blog?p=89; 3 pgs.

Allamaraju; "Idempotency Explained"; Published Feb. 21, 2008; 5 pgs.

Australian Notice of Allowance in Application 2011338814, dated May 3, 2016, 3 pgs.

Australian Office Action in Application 2011338814 dated Mar. 24, 2016, 4 pgs.

Chaisiri et al., "Optimal Virtual Machine Pacement across Multiple Cloud Providers"; School of Computer Engineering, Nanyang Technological University, Singapore; 2009 IEEE; 8 pgs.

Chinese Decision on Reexamination in Application 201110430658.2, dated Jul. 5, 2017, 18 pgs.

Chinese Decision on Rejection Issued in Patent Application No. 201110430658.2, dated Dec. 15, 2015, 9 Pages.

Chinese Fourth Office Action dated Dec. 25, 2014 cited in Application No. 201110340491.0, 9 pgs.

Chinese Fourth Office Action dated Jun. 17, 2015 cited in Application No. 201110430658.2, 10 pgs.

Chinese Fourth Office Action Issued in Patent Application No. 201110339862.3, dated Sep. 6, 2015, 6 Pages.

Chinese Notice of Allowance dated May 26, 2014 cited in Appln No. 201110339912.8, 4 pgs.

(56) References Cited

OTHER PUBLICATIONS

Chinese Notice of Allowance in Patent Application 201110339862. 3, dated Dec. 22, 2015, 4 pgs.
Chinese Notice of Reexamination in Application 201110430658.2, dated Nov. 1, 2016, 4 pgs.
Chinese Notice on Grant dated Feb. 10, 2014 cited in 201110339894. 3, 4 pgs.
Chinese Notice on Grant dated Feb. 16, 2015 cited in 201110340455. 4, 4 pgs.
Chinese Notice on Grant dated Jul. 3, 2014 cited in 201110340105. 8, 4 pgs.
Chinese Notice on Grant dated Jun. 29, 2015 cited in 201110340491. 0, 4 pgs.
Chinese Notice on Grant dated Mar. 31, 2015 cited in 201110339964. 5, 4 pgs.
Chinese Notice on Grant dated May 26, 2014 cited in 20111033912. 8, 3 pgs.
Chinese Notification of Reexamination in Application 201110430658. 2, dated Jan. 26, 2017, 12 pgs.
Chinese Office Action dated Aug. 28, 2013 cited in Appln. No. 201110340491.0, 10 pgs.
Chinese Office Action dated Dec. 17, 2013 cited in Appln. No. 201110430658.2, 13 pgs.
Chinese Office Action dated Dec. 19, 2013 cited in Appln. No. 201110339912.8, 11 pgs.
Chinese Office Action dated Dec. 30, 2013 cited in Appln. No. 201110339964.5, 12 pgs.
Chinese Office action dated Jan. 16, 2014 cited in Appln. No. 201110339862.3, 16 pgs.
Chinese Office Action dated Jan. 24, 2014 cited in Appln. No. 201110340105.8, 11 pgs.
Chinese Office Action dated Nov. 22, 2013 cited in Appln. No. 201110339894.3, 11 pgs.
Chinese Office Action dated Oct. 14, 2013 cited in Appln No. 201110339864.2, 13 pgs.
Chinese Office Action dated Oct. 31, 2013 cited in Appln No. 201110340455.4, 13 pgs.
Chinese Second Office Action dated Jul. 11, 2014 cited in 201110430658.2, 10 pgs.
Chinese Second Office Action dated Jun. 11, 2014 cited in Appln. No. 201110340455.4, 6 pgs.
Chinese Second Office Action dated Jun. 3, 2014 cited in Appln No. 201110339864.2, 11 pgs.
Chinese Second Office Action dated Mar. 27, 2014 cited in Appln No. 201110340491.0, 6 pgs.
Chinese Second Office Action dated May 26, 2014 cited in Appln No. 201110339964.5, 6 pgs.
Chinese Second Office Action dated Sep. 18, 2014 cited in Appln No. 201110339862.3, 17 pgs.
Chinese Third Office Action dated Jan. 14, 2015 cited in Application No. 201110430658.2, 10 pgs.
Chinese Third Office Action dated Jun. 25, 2014 cited in Appln No. 201110340491.0, 12 pgs.
Chinese Third Office Action dated Sep. 15, 2014 cited in Appln No. 201110340455.4, 6 pgs.
Chinese Third Office Action Issued in Patent Application No. 201110339862.3, dated Apr. 7, 2015, 6 Pgs.
Chinese Third Office Action Issued in Patent Application No. 201110339964.5, dated Dec. 12, 2014, 8 pgs.
Chinese Third Office Action dated Dec. 12, 2014 in Application No. 201110339864.2, 11 pgs.
Chronic db; "Live Database Schema Updates—Zero Downtime"; Retrieved Sep. 20, 2010; http://chronicdb.com/benefits_of_chronicdb; 3 pgs.
Crets; "Idempotent Services"; Blog of Guy Crets; Jul. 9, 2008; 1 pg.
CSDN.Net; "Google Docs & Spreadsheets Tour", obtained on Feb. 7, 2007 at: blog.csdn.net/plan9x/article/details/1501811, 4 pgs.
Das et al., "ElasTraS: An Elastic, Scalable, and Self Managing Transactional Database for the Cloud"; Department of Computer Science, University of California, Santa Barbara, CA; UCSB Computer Science Technical Report 2010-04; 14 pgs.
EP Extended Search Report dated Nov. 14, 2014 cited in Appln No. PCT/US2011/056594, 7 pgs.
EP Supplementary Search Report dated Dec. 2, 2014 cited in Appln No. PCT/US2011/056594, 1 pg.
Exortech; "Zero-Downtime Database Deployment"; Published Feb. 1, 2009; http://exortech.com/blog/2009/02/01weekly-release-blog-11-zero-downtime-database-deployment; 3 pgs.
Forster et al.; "Using SAML Security Tokens with Microsoft Web Services Enhancements"; Published Apr. 29, 2008; http://www.ibm.com/ developerworks/tivoli/library/t-samlwse/index.html; 23 pgs.
Gonzalez et al., "Google Fusion Tables: Data Management, Integration and Collaboration in the Cloud", SoCC '10, Jun. 10-11, 2010, pp. 175-180.
Google et al., "Google Docs & Spreadsheet Tour", Feb. 2007, pp. 1-14.
Google et. al. "What is the correct syntax for import range function for the key attribute?", http://productforums.google.com/forum/#!topic/docs/aqJAApdcr88; published Jan. 18, 2009; 3 pgs.
Hyser et al., "Autonomic Virtual Machine Placement in the Data Center"; HP Laboratories; Feb. 26, 2008; 11 pgs.
International Search Report dated Apr. 25, 2012 cited in Appln No. PCT/US2011/054516.
International Search Report dated Jun. 15, 2012 cited in Appln No. PCT/US2011/062170.
International Search Report dated Mar. 26, 2012 cited in Appln No. PCT/US2011/053296.
International Search Report dated Mar. 6, 2012 cited in Appln No. PCT/US2011/054566.
International Search Report dated Mar. 6, 2012 cited in Appln No. PCT/US2011/055412.
International Search Report dated May 1, 2012 cited in Appln No. PCT/US2011/052175.
International Search Report dated May 17, 2012 cited in Appln No. PCT/US2011/054642.
International Search Report dated May 3, 2012 cited in Appln No. PCT/US2011/053370.
International Search Report dated May 4, 2012 cited in Appln No. PCT/US2011/056594.
Japanese Notice of Rejection Issued in Patent Application No. 2013-543201, dated Sep. 1, 2015, 6 Pages.
KaChing Engineering; "No Downtime Database Schema Changes"; Published Aug. 15, 2010; http://eng.kaching.com/2010/08/no-downtime-database-schema-changes.html; 4 pgs.
Kim, "Virtual Machine Placement Optimization"; Carnegie Mellon Engineering, Carnegie Institute of Technology; Retrieved Date—Aug. 26, 2010; 2 pgs.
Kumar; "Sharing and Previewing Google Docs in Socialwok: Google Data SPI"; Published Apr. 9, 2010; http://googleappsdeveloper.blogspot.com/2010/04/ sharing-and-previewing-google-docs-in.html; 6 pgs.
Matsui, Mikihiko, "Exhaustive Guide of Google Documents That Can Be Utilized Without Installing Them", In Journal of Nikkei Linux, vol. 10, No. 1, Jan. 8, 2008, 12 pgs. (No Translation).
Meng et al., "Improving the Scalability of Data Center Networks with Traffic-aware Virtual Machine Placement"; IBM T.J. Watson Research Center; Published May 6, 2010; 9 pgs.
Microsoft Corporation; "Messaging Patterns in Service-Oriented Architecture, Part 1"; Published Apr. 2004; 10 pgs.
Microsoft Corporation; "Scaling Out SQL Server 2005"; Published Date: Apr. 2006; http://msdn.microsoft.com/en-us/library/aa479364.aspx; 15 pgs.
Microsoft TechNet; "Configure a Server Farm for Minimal Downtime During Software Updates (Office SharePoint Server 2007)"; Published Sep. 17, 2009; http://technet.microsoft.com/en-us/library/ee5144459(office.12).aspx; 26 pgs.
Microsoft TechNet; "Configure Claims-Based Authentication Using Windows Live ID (SharePoint Server 2010)"; Published Sep. 9, 2010; http://technet.microsoft.com/en-us/library/ff973117(printer).aspx; 17 pgs.
Microsoft TechNet; "Placing Virtual Machines on Hosts"; 2010 Microsoft Corporation: 3 pgs.

(56) References Cited

OTHER PUBLICATIONS

Microsoft; "Virtual Machine Manager"; Retrieved Sep. 21, 2010; http://www.microsoft.com/systemcenter/en/us/virtual-machine-manager.aspx; 2 pgs.
MSDN Magazine; "Designing Services for Windows Azure"; Published Jan. 2010; 11 pgs.
Notice of Allowance dated Mar. 4, 2015 cited in U.S. Appl. No. 12/908,681, 16 pgs.
Oracle9i Database Migration; "Compatibility and Interoperability"; Retrieved Sep. 20, 2010; http://download.oracle.com/docs/cd/A97630_01/server.920/a96530/migcompa.htm; 42 pgs.
Ranganathan: "Idempotency in Services"; Published Dec. 1, 2009; 21 pgs.
Russian Notice of Allowance in Application 2013126527, dated May 27, 2016, 18 pgs.
Russian Office Action dated Nov. 11, 2015 in Appln No. 2013126527, 6 pgs. (No translation).
Stackexchange.com et. al., "How do I link a cell in Google Spreadsheets to a cell in another document?" See Google Spreadsheets function list ImportRange http://webaps.stackexchange.com/questions/786/how-do-i-link-a-cell-in-google-spreadsheets-to-a-cell-in-anotehr-document; published Jul. 1, 2010; 6 pgs.
Taiwan Notice of Allowance dated Sep. 30, 2015 in Appln No. PI-14981, 6 pgs.
Tamura, Norio, "Competition of Free-of-Charge Web Services", In Journal of Nikkei Personal Computing No. 613, Nov. 8, 2010, pp. 36-43 (No translation).
Tarighi et al., "A New Model for Virtual Machine Migration in Virtualized Cluster Server Based on Fuzzy Decision Making"; Journal of Telecommunications, vol. 1, Issue 1, Feb. 2010; 12 pgs.
U.S. Office Action dated Apr. 16, 2012 cited in U.S. Appl. No. 12/908,639.
U.S. Office Action dated Apr. 27, 2012 cited in U.S. Appl. No. 12/908,703.
U.S. Office Action dated Aug. 16, 2013 cited in U.S. Appl. No. 12/908,681.
U.S. Office Action dated Aug. 4, 2014 cited in U.S. Appl. No. 13/768,727, 49 pgs.
U.S. Office Action dated Dec. 5, 2012 cited in U.S. Appl. No. 12/953,379.
U.S. Office Action dated Jan. 13, 2016 cited in U.S. Appl. No. 14/444,572, 25 pgs.
U.S. Office Action dated Jan. 15, 2015 cited in U.S. Appl. No. 12/964,633, 20 pgs.
U.S. Office Action dated Jul. 30, 2015 cited in U.S. Appl. No. 12/964,633, 24 pgs.
U.S. Office Action dated Jul. 6, 2015 cited in U.S. Appl. No. 14/444,572, 61 pgs.
U.S. Office Action dated Jun. 2, 2015 cited in U.S. Appl. No. 12/908,623, 28 pgs.
U.S. Office Action dated Jun. 5, 2013 cited in U.S. Appl. No. 12/953,379.
U.S. Office Action dated Mar. 12, 2014 cited in U.S. Appl. No. 12/908,653, 19 pgs.
U.S. Office Action dated Mar. 18, 2014 cited in U.S. Appl. No. 12/908,681, 26 pgs.
U.S. Office Action dated Mar. 20, 2013 cited in U.S. Appl. No. 12/908,590.
U.S. Office Action dated Mar. 27, 2013 cited in U.S. Appl. No. 12/908,623.
U.S. Office Action dated Mar. 28, 2013 cited in U.S. Appl. No. 12/964,633.
U.S. Office Action dated May 14, 2013 cited in U.S. Appl. No. 12/908,694.
U.S. Office Action dated May 19, 2014 cited in U.S. Appl. No. 13/657,561, 59 pgs.
U.S. Office Action dated May 21, 2014 cited in U.S. Appl. No. 12/908,623, 20 pgs.
U.S. Office Action dated May 7, 2014 cited in U.S. Appl. No. 12/964,633, 11 pgs.
U.S. Office Action dated Nov. 14, 2014 cited in U.S. Appl. No. 12/908,681, 27 pgs.
U.S. Office Action dated Nov. 30, 2012 cited in U.S. Appl. No. 12/908,653.
U.S. Office Action dated Nov. 6, 2012 cited in U.S. Appl. No. 12/908,694.
U.S. Office Action dated Nov. 7, 2013 cited in U.S. Appl. No. 12/964,633, 18 pgs.
U.S. Office Action dated Oct. 22, 2013 cited in U.S. Appl. No. 12/908,623, 23 pgs.
U.S. Office Action dated Sep. 10, 2014 cited in U.S. Appl. No. 12/908,623, 26 pgs.
U.S. Office Action dated Sep. 16, 2013 cited in U.S. Appl. No. 12/908,653, 28 pgs.
U.S. Office Action dated Sep. 19, 2013 cited in U.S. Appl. No. 12/953,379, 47 pgs.
U.S. Office Action dated Sep. 19, 2014 cited in U.S. Appl. No. 12/964,633, 24 pgs.
U.S. Office Action dated Sep. 24, 2014 cited in U.S. Appl. No. 13/858,630, 63 pgs.
U.S. Appl. No. 12/964,633, Notice of Allowance dated Apr. 25, 2017, 8 pgs.
U.S. Appl. No. 12/964,633, Office Action dated Jan. 26, 2017, 26 pgs.
U.S. Appl. No. 12/964,633, Office Action dated Jul. 25, 2016, 23 pgs.
U.S. Appl. No. 14/445,572, Office Action dated Dec. 2, 2016, 17 pgs.
U.S. Appl. No. 14/445,572, Office Action dated Jun. 21, 2017, 17 pgs.
U.S. Appl. No. 14/445,572, Office Action dated Aug. 10, 2016, 16 pgs.
U.S. Appl. No. 14/754,150, Office Action dated Apr. 4, 2016, 16 pgs.
U.S. Appl. No. 14/754,150, Office Action dated Aug. 16, 2016, 17 pgs.
Vmware vSphere; "Vmware vCenter Update Manager"; Retrieved Sep. 14, 2010; 2 pgs.
Vmware; "Automating High Availability (HA) Services with Vmware HA"; Copyright Jun. 5, 2006; 15 pgs.
Wang et al., "A Study and Performance Evaluation of the Multi-Tenant Data Tier Design Patterns for Service Oriented Computing"; IBM China Research Lab, Beijing, China; IEEE Computer Society, 2008 IEEE; 8 pgs.
"Second Office Action Issued in Chinese Patent Application No. 201610127085.9", dated Jan. 11, 2019, 05 Pages.
"Summons to Attend Oral Proceedings Issued in European Patent Application No. 11834944.8", dated Mar. 20, 2019, 2 Pages.
"Office Action Issued in European Patent Application No. 11846557.4", dated Jul. 10, 2019, 7 Pages.
"Examination Report Issued in Indian Patent Application No. 3837/CHENP/2013", dated Jul. 1, 2019, 7 Pages.
Chiasson, Chrs, "Incorrect Sharing Status of Public Document Displayed in Google Docs", Retrieved From: https://support.google.com/docs/forum/AAAABuH1jm0HCtvlw20y_l/?hl=en&msgid=vEM0xwXyLQYJ&gpf=d/msg/docs/HCtvlw20y_I/vEM0xwXyLQYJ, Nov. 27, 2010, 4 Pages.
Wittwer, Jon, "Ideas for Embedding Google Spreadsheets in Your Blog or Website", Retrieved From: https://www.vertex42.com/News/embedding-google-spreadsheets.html, Feb. 26, 2009, 4 Pages.

\* cited by examiner

CODELESS SHARING OF SPREADSHEET OBJECTS

CROSS-REFERENCE TO RELATED APPLICATIONS

This application is a continuation of U.S. patent application Ser. No. 12/964,633, now U.S. Pat. No. 9,721,030, filed on Dec. 9, 2010, entitled "CODELESS SHARING OF SPREADSHEET OBJECTS", which application is incorporated herein by reference. To the extent appropriate, a claim for priority is made to the above-identified application.

BACKGROUND

Many people utilize spreadsheets to interact with data. A user typically arranges the data in a desired configuration within one or more spreadsheet workbook. Sharing this information, however, can be a cumbersome process. For example, copies of the workbook or portions of the workbook may need to be made and emailed to other users, permissions may need to be set up, the copies may not reach all of the intended recipients, and multiple copies may result in inconsistent data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A user interface that when selected triggers the automatic sharing of a spreadsheet object in a spreadsheet with a chosen network service (e.g. social network, blog, or some other network location). For example, cells, tables, pivot tables, charts and other objects of the spreadsheet may be selected to be shared using the user interface. When a spreadsheet object is selected and indicated to be shared using the user interface, the spreadsheet is automatically saved to a network share, permissions are set for the spreadsheet to share the spreadsheet object, and the spreadsheet object is shared with the chosen network service. For example, a user may share a chart with a social networking site by right clicking on the chart within the spreadsheet and selecting the option to share the chart with the social networking site. Changes made to the spreadsheet after the spreadsheet object is shared may be reflected in the spreadsheet object on the network service.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
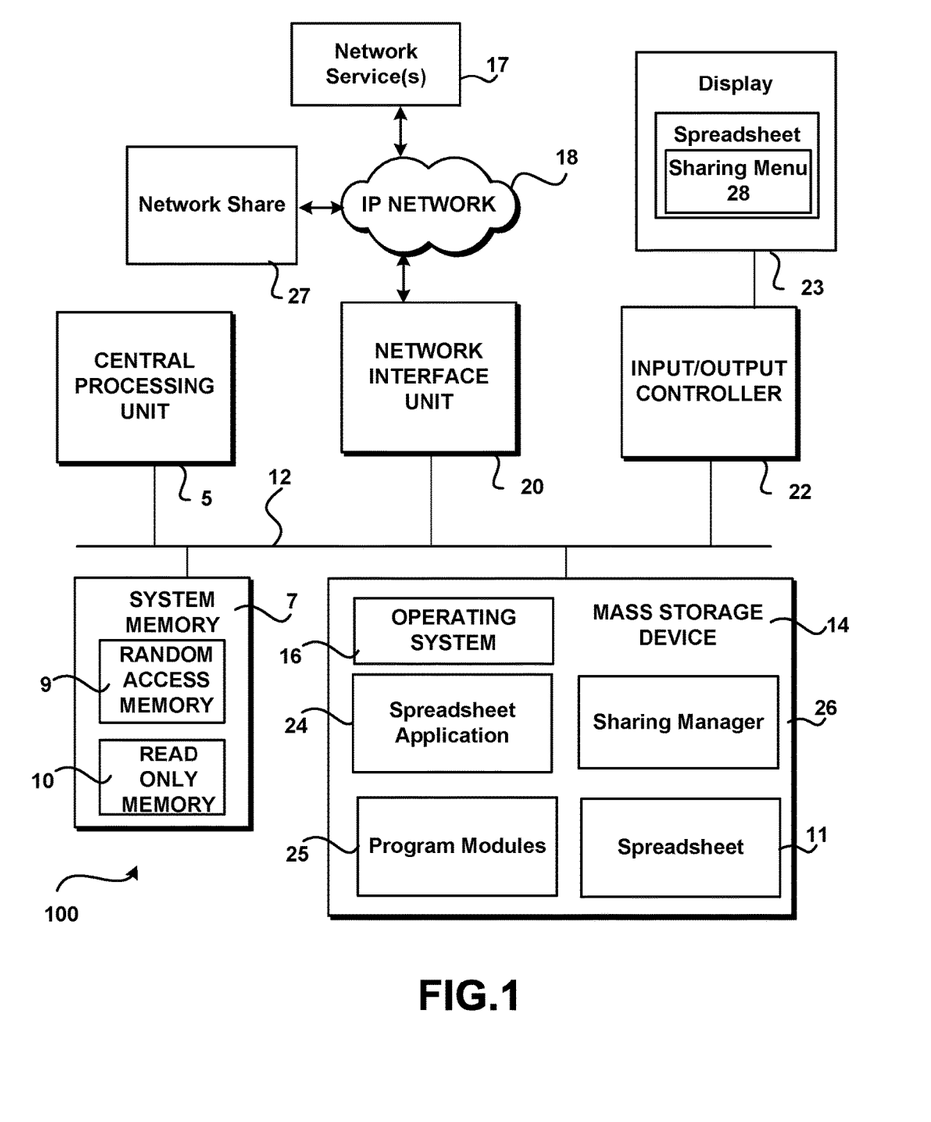
FIG. 1 illustrates an exemplary computing environment.

Referring now to FIG. 1, an illustrative computer environment for a computer 100 utilized in the various embodiments will be described. The computer environment shown in FIG. 1 includes computing devices that each may be configured as a server, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, spreadsheet 11, spreadsheet application 24, other program modules 25, and sharing manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone, a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as WINDOWS SERVER® or the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs, including a spreadsheet application 24 and program modules 25. According to an embodiment, the spreadsheet application 24 is the MICROSOFT EXCEL spreadsheet application. Other spreadsheet applications may also be used.

Sharing manager 26 is configured to allow the sharing of one or more spreadsheet objects within a spreadsheet. Sharing manager 26 may be located externally from spreadsheet application 24 as shown or may be a part of spreadsheet application 24. Further, all/some of the functionality provided by sharing manager 26 may be located internally/externally from spreadsheet application 24.

A user interface, such as sharing menu 28, allows a user to select one or more spreadsheet objects to share with a network service. When a user selects a spreadsheet object to share using sharing menu 28, sharing manager 26 performs operations to automatically permission and share the spreadsheet object with the chosen network service 17 (e.g. social network, blog, or some other network location). For example, cells, tables, charts and other objects of the spreadsheet may be selected to be shared using the sharing menu 28 user interface. When the spreadsheet object is selected and indicated to be shared using the user interface, the sharing manager saves the spreadsheet a network share, such as network share 27, permissions are set for the spreadsheet to share the spreadsheet object, and the spreadsheet object is shared to network service 17. For example, a user may share a chart to a social networking site by selecting sharing menu 28 associated with spreadsheet application 24 and selecting the option to share the chart on the social networking site. The spreadsheet stored on network share 27 is connected to the network service 17 and computing device 100 such that changes made to the spreadsheet after the spreadsheet object is shared are optionally reflected in the spreadsheet object on network service 17.

Figure 2:
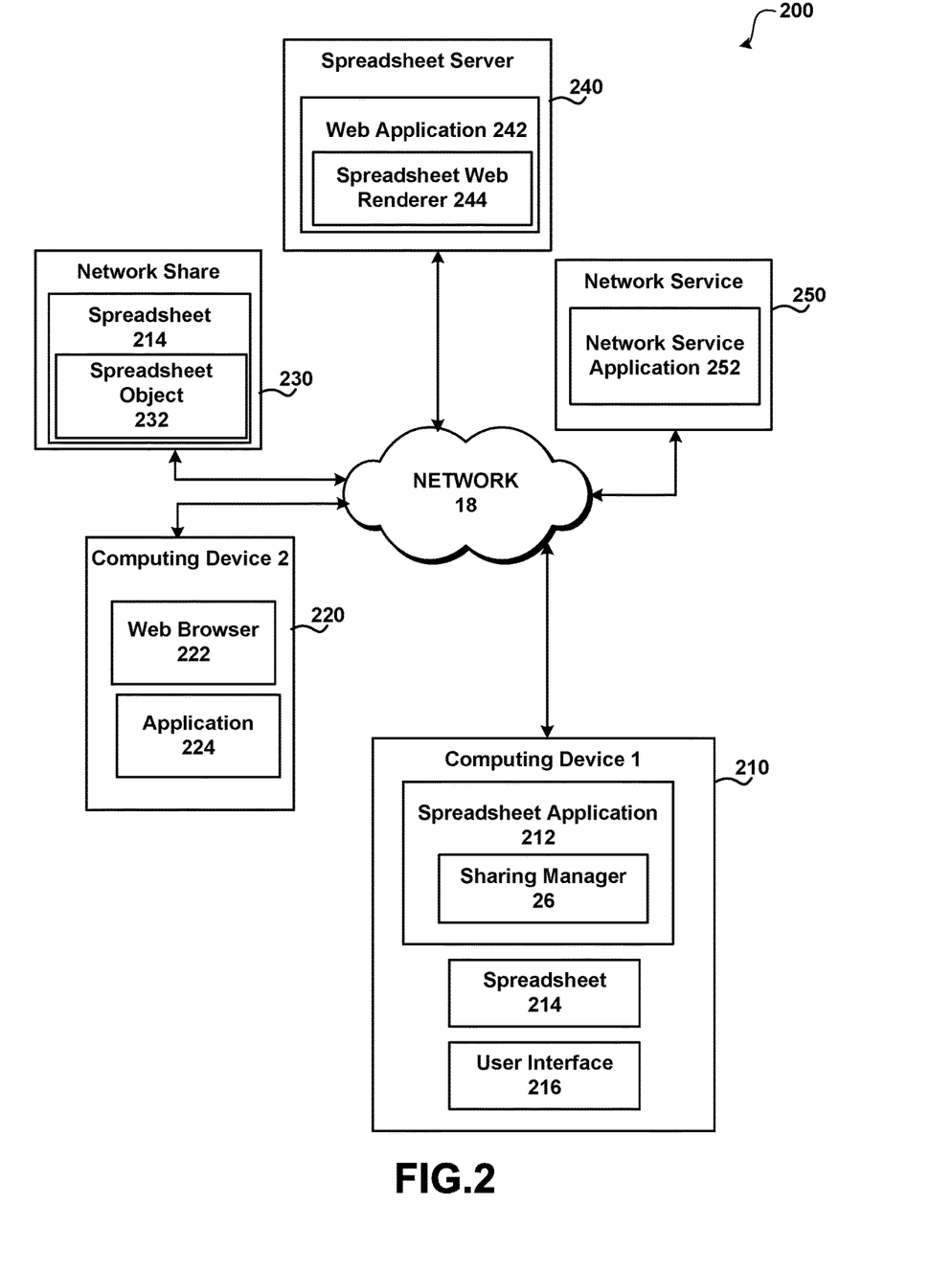
FIG. 2 shows a system for codeless sharing of spreadsheet objects with a network service.

FIG. 2 shows a system for codeless sharing of spreadsheet objects with a network service. As illustrated, system 200 includes computing device 1 (210), computing device 2 (220), network share 230, spreadsheet server 240 and network service 250.

The computing devices may be any type of computing device that is configured to perform the operations relating to the sharing of one or more spreadsheet objects with a network service. For example, some of the computing devices may be: mobile computing devices (e.g. cellular phones, tablets, smart phones, laptops, and the like); desktop computing devices and servers. Some computing devices may be arranged to provide an online cloud based service (e.g. interacting with spreadsheets online), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, computing device 2, network share 230, spreadsheet server 240 and network service 250.

Computing device 1 includes spreadsheet application 212, spreadsheet 214 and user interface 216. As illustrated, computing device 1 is used by a user to select one or more objects to share with a network service, such as network service 250. The network service may be a social networking site, a blog, a web page hosted by a service, or some other network location.

Spreadsheet 214 comprises different cells/spreadsheet objects that may be selected for sharing with a network service. The spreadsheet object may be any data/object within the spreadsheet. For example, cells, tables, charts and other objects of the spreadsheet may be selected for sharing.

Sharing user interface (UI) 216 is used to select one or more spreadsheet objects/cells within spreadsheet 214 to share. One or more user interfaces of one or more types may be used to share a spreadsheet object. For example, UI 216 may be a context menu, a menu within a menu bar, a menu item selected from a ribbon user interface, a graphical menu, and the like. Generally, UI 216 is configured such that a user may easily share the selected spreadsheet object(s) to the network service, such as a social networking site. When the sharing option is selected within user interface 216, zero or more options may be presented to the user before the selected spreadsheet object is shared to the network service. For example, a user may simply select an option within UI 216 such as "Share to Social Networking Site X" to share the spreadsheet object with Networking Site X. Other options that are associated with sharing the spreadsheet object may be automatically set and/or set at a different time. For example, a default set of sharing permissions may be set, the service(s) to share the spreadsheet object(s) may be selected, and the like. A user may also be presented with user interface elements that selects these options after invoking UI 216.

After the spreadsheet object within spreadsheet 214 is selected for sharing, sharing manager 26 automatically saves all/portion of spreadsheet 214 to a network share, such as network share 230. For example, the entire spreadsheet workbook may be saved to network share 230 or only a portion of the spreadsheet workbook may be saved to the network share. The saving of spreadsheet 214 occurs automatically. Network share 230 is accessible by the computing devices that interact with spreadsheet 214 and/or spreadsheet object 232. The network share may be associated with an online service that supports online access/interaction with the spreadsheet and spreadsheet objects. For example, spreadsheet server 240 may be configured as an online service to provide online users with the ability to interact/modify spreadsheets. The network service with which the spreadsheet object is shared may also access the object on the network share. According to another embodiment, the spreadsheet object is stored on the chosen network service.

Computing device 2 includes one or more applications, such as web browser 222 and application 224 that may be configured to view/enter/interact with data that is associated with spreadsheet 214 and/or spreadsheet object 232 that is linked to a spreadsheet, such as spreadsheet 214 on network share 230. For example, web browser 222 may be used to access a social networking site that includes a shared spreadsheet object, such as shared spreadsheet object 232. Similarly, application 224 may be configured to view/enter/interact with data that is associated with spreadsheet 214 and/or spreadsheet object 232.

Spreadsheet server 240 includes web application 242 that comprises spreadsheet web renderer 244. According to an embodiment, spreadsheet server 240 is configured as a server that is located within an online service that is configured to provide services relating to displaying an interacting with spreadsheets. Web application 242 is configured for receiving and responding to requests relating to spreadsheet documents. For example, spreadsheet server 240 may access spreadsheet 214 or spreadsheet object 232 stored on network share 230. Web application 242 is operative to provide an interface to a user of a computing device, such as computing device 2, to interact with a spreadsheet accessible via network 18. Web application 242 may communicate with a spreadsheet calculation server that is used for retrieving and calculating spreadsheets, such as the spreadsheet 214 stored at network share 230.

Spreadsheet server 240 receives requests from computing devices, such as network service 250 and/or computing device 2. The computing device 2 or network service 250 may transmit a request to spreadsheet server 240 to view the shared spreadsheet object 232 within the context of the Web browser application, such as Web browser 222 on computing device 2. In response to such a request, the Web application 242 obtains the spreadsheet/spreadsheet object from network share 230, based on whether the user has permissions to the spreadsheet/object. The portion of the spreadsheet to display (based on the selected object(s) is converted into a markup language format, such as the ISO/IEC 29500 format. The spreadsheet may be converted by spreadsheet server 240 or by one or more other computing devices. Once the Web application 242 has received the markup language representation of the spreadsheet, the spreadsheet server utilizes the spreadsheet Web renderer 244 to convert the markup language formatted spreadsheet into a representation of the spreadsheet that may be rendered by a Web browser application, such as Web browser 222 on computing device 2. The rendered spreadsheet object appears substantially similar to the output of the spreadsheet application 212 on computing device 1 when utilized to view the same spreadsheet object. Once the spreadsheet Web renderer 244 has completed rendering the file, it is returned by the spreadsheet server 240 to the requesting computing device, such as computing device 2, where it may be rendered by the Web browser 222.

The spreadsheet Web renderer 244 is also configured to render into the markup language file one or more scripts for allowing the user of a computing device, such as computing device 2 to interact with the spreadsheet object within the context of the Web browser 22. Spreadsheet Web renderer 244 is operative to render script code that is executable by the Web browser application 222 into the returned Web page. The scripts may provide functionality, for instance, for allowing a user to change a view of the spreadsheet object and/or to modify values that are related to the spreadsheet object. In response to certain types of user input, the scripts may be executed. When a script is executed, a response may be transmitted to the spreadsheet server 240 indicating a spreadsheet object within the spreadsheet that has been acted upon, to identify the type of interaction that was made, and to further identify to the Web application 242 the function that should be performed upon the appropriate spreadsheet object.

The permissions associated with the spreadsheet object(s) shared with network service 250 are used to allow/restrict users from viewing/interacting with the shared objects. For example, the permissions may specify a list of users that may view and interact with the spreadsheet and another group of users that may only view the spreadsheet objects. The list of users may be determined using information from the network service on which the spreadsheet object is shared. For example, a user's group of friends on a social networking site may be allowed to always view/interact with a shared spreadsheet object unless a user is specifically excluded. Other lists may also be searched to determine authorized users (e.g. contact lists, Instant Messaging Lists, recent addressees of emails, a favorites list, and the like). Alternatively a user may specify/select the permissions and users that may view/interact with the shared spreadsheet object using UI 216. According to an embodiment, the network service specifies the permissions to be applied to the shared object. The permissions may be stored in network share 230 and/or in some other location (e.g. spreadsheet server 240 or network service 250). In addition to restricting the users ability to view/interact with the shared object, the permissions may also restrict access to other portions of the spreadsheet on network share 230 from being provided to the network service. For example, while an entire spreadsheet may be stored on network share 230 and used by spreadsheet server 240 for performing operations on the shared spreadsheet object, only the shared spreadsheet objects are viewable/interact able through network service 250.

Figure 3:
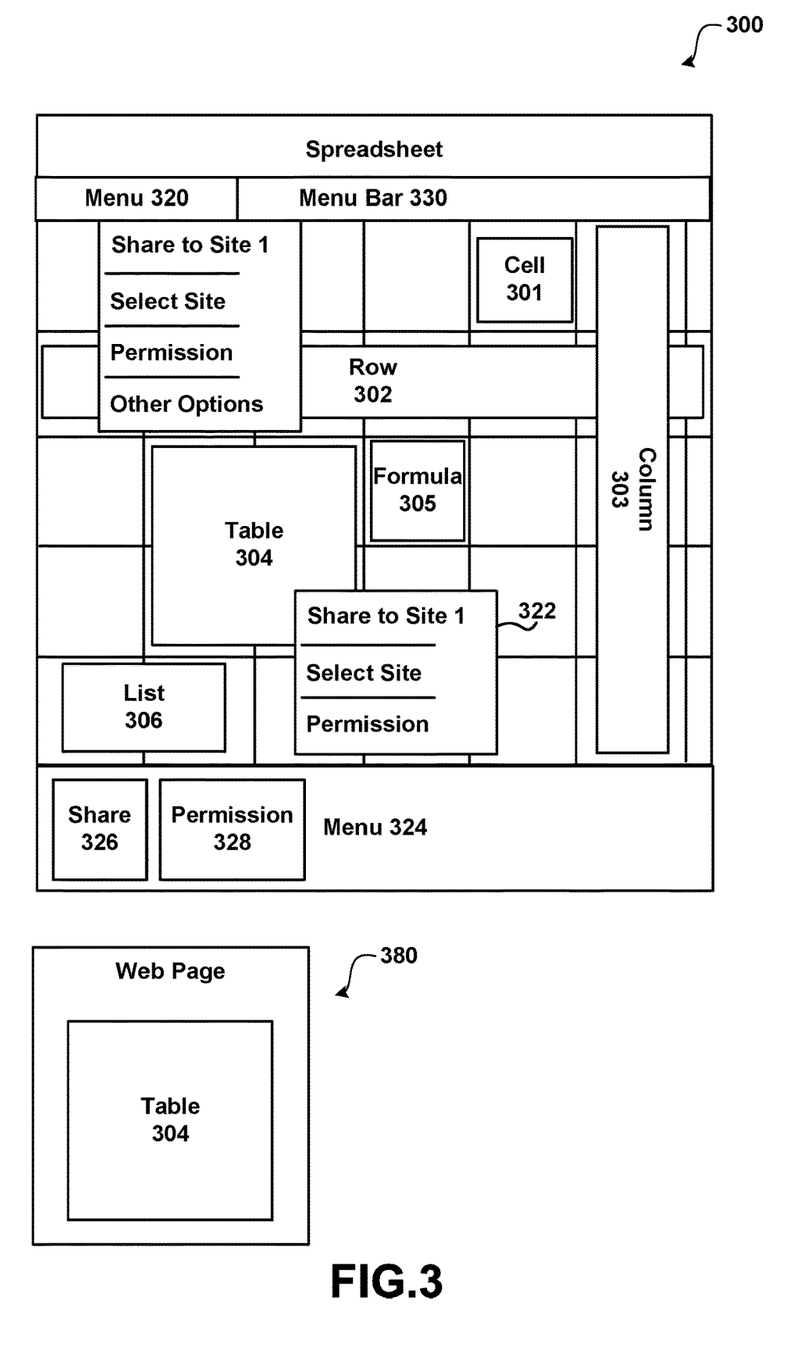
FIG. 3 shows a spreadsheet comprising different spreadsheet objects that may be shared.

FIG. 3 shows a spreadsheet comprising different spreadsheet objects that may be shared. As illustrated spreadsheet 300 shows different user interfaces, menus, and spreadsheet objects including cell 301, row 302, column 303, table 304, formula 305 and list 306. While only one object of each type is shown, more or fewer objects may be included within spreadsheet 300. Other types of objects may also be included within spreadsheet 300 that may be selected to be shared.

Spreadsheet 300 includes a grid having rows and columns. The columns and rows define the workspace for the currently selected workbook. Each of the cells defined by a particular row and column combination can be edited with numerical or text data and commands may be performed on the various cells to perform virtually unlimited types of analysis operations.

Spreadsheet 300 also includes various user interface elements for navigating within the currently selected spreadsheet or within other spreadsheets within the currently selected workbook. Spreadsheet 300 also shows exemplary user interfaces that may be used for sharing one or more spreadsheet objects, such as menu 320, menu 322 and menu 324. Menu 320 is a menu that is contained within menu bar 330. When menu 320 is selected various sharing options are available to be selected. The sharing options may comprise a variety of options, such as sharing to a specific network service (e.g. "Share to Site 1"), selecting a site to share one or more spreadsheet objects, permission options, and other options. For example, the other options may include options to select spreadsheet objects to share. When a user selects the sharing option, the selected spreadsheet object(s) is automatically shared to the chosen network service. A context menu may also be used to receive the sharing options. For example, a user may right click on Table 304 which displays context menu 322. The user may then select the sharing options to have Table 304 shared with the chosen network service. Web page 380 illustrates Table 304 shown within a web page of the network service. A user may view/interact with Table 304 through the network service and any changes made to the spreadsheet that affect Table 304 are reflected in the shared Table 304. As can be seen, the sharing process of an object may be as simple for a user as selecting a single menu option. The sharing options may also be presented in other manners. For example, a menu bar 324 may show graphical icons (e.g. share 326, permission 328) that allows a user to select the sharing options. Shortcuts may also be provided (e.g. a key or combination of keys) to select the sharing menu/options.

Figure 4:
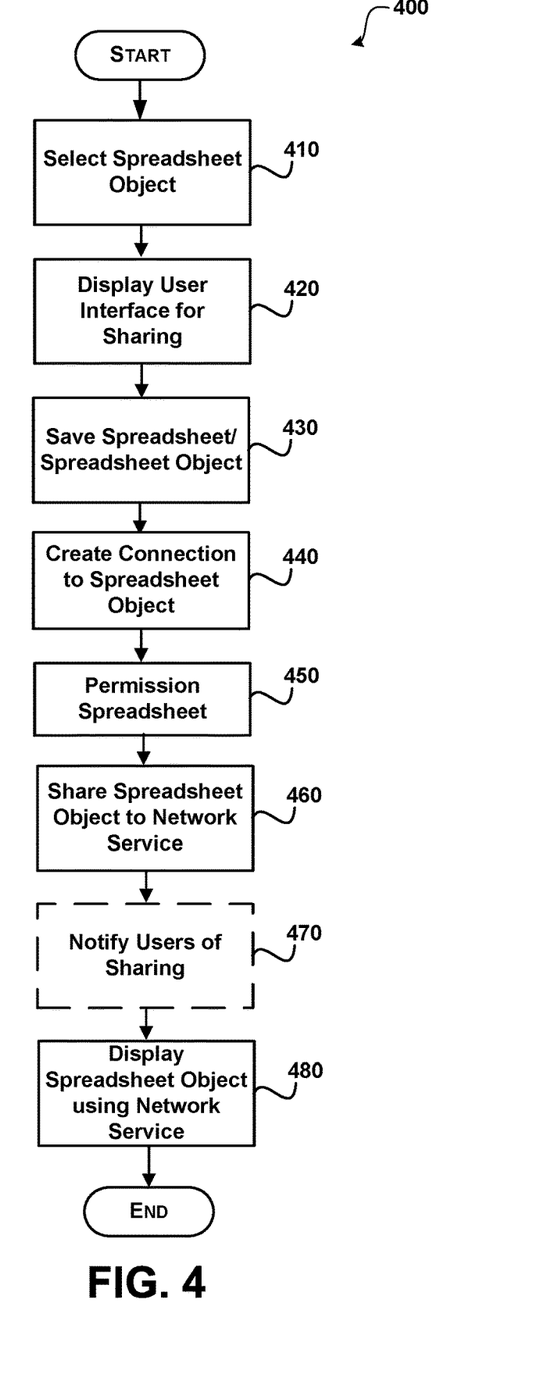
FIG. 4 illustrates a process for sharing a spreadsheet object in a spreadsheet.

Referring now to FIG. 4 an illustrative process for sharing a spreadsheet object in a spreadsheet will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, process 400 moves to operation 410, where a spreadsheet object is selected within a spreadsheet for sharing. One or more spreadsheet objects/cells may be selected for sharing. For example, a table and a chart may be selected, a single cell may be selected, two tables may be selected, and the like.

Moving to block 420, the user interface for sharing is displayed. The user interface may be displayed before block 410 or after the spreadsheet object is selected and/or at other times during the sharing process. Different types of UIs may be used to share/select a spreadsheet object, such as but not limited to, a context menu, a menu within a menu bar, an icon based menu, a stand-alone menu, a shortcut key, and the like may be used to share a spreadsheet object. For example, a user may select a spreadsheet object within the spreadsheet and then right click to bring up a context menu that presents one or more options to share the spreadsheet object.

Flowing to operation 430, the selected spreadsheet/spreadsheet object to share is automatically saved to a network share. For example, a spreadsheet/spreadsheet object on a local computing device may be saved to a network share. According to an embodiment, the entire spreadsheet containing the spreadsheet object is saved to the network share. The network share may be associated with the network service that is selected to share the object with and/or may be associated with another online service. For example, the network share may be associated with an online spreadsheet service.

Transitioning to operation 440, a connection is created between the network share, the spreadsheet object on the computing device sharing the spreadsheet object and the network service. The connection is used to help ensure that changes made to the spreadsheet that affect the shared spreadsheet object are updated in the shared object. For example, if a user on the computing device that initially shared the object updates the shared object, the updates may be reflected to a user viewing the shared object on the network service. Similarly, when a user interacts with the shared spreadsheet object on the network service, changes may be reflected in the original spreadsheet on the user's computer who shared the spreadsheet object.

Flowing to operation 450, permissions are set for the spreadsheet. The permissions associated with the shared spreadsheet object(s) are used to allow/restrict users from viewing/interacting with the spreadsheet and the shared spreadsheet object(s). Some/all of the permissions may be manually or automatically set. For example, the permissions restricting viewing of only the shared spreadsheet object may be set automatically such that only the shared spreadsheet objects are viewable on the network service. In this way, the users interacting/viewing the spreadsheet object through the network service do not have access to the parts of the spreadsheet that are not shared. The permissions limiting the users to view the spreadsheet may be manually set. For example, a user may enter/select the group of users that are allowed to view/interact with the spreadsheet object. The permissions may be set when selecting the spreadsheet object for sharing and/or at some other time. For example, a user may set permissions on the network service and the network service may send the permissions to the service enforcing the permissions (i.e. a spreadsheet server).

Moving to operation 460, the spreadsheet object is shared with the network service. The sharing may occur using different methods. For example, a link may be provided to the network service, a markup language rendering may be embedded on a page of the network service, the spreadsheet/spreadsheet object may be provided to the network service, and the like.

Transitioning to optional operation 470, the users with whom the spreadsheet object has been shared with may be notified of the sharing. The notification may be made using one or more notification methods. For example, a social network may send a sharing notification message, the spreadsheet application may send a message to the users, and the like.

Flowing to operation 480, the spreadsheet object is displayed through the network service. According to an embodiment, only the spreadsheet object that is shared is displayed and the other portions of the spreadsheet are not displayed to the user(s) of the network service. Updates to the spreadsheet object may be made through the network service and/or through other computing devices. The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for sharing a spreadsheet object that is contained within a spreadsheet without sharing other spreadsheet objects that are contained within the spreadsheet to a network service, comprising:
  receiving, through a spreadsheet application, a selection of the spreadsheet object within the spreadsheet to share on a network service, wherein the selected spreadsheet object is one of a plurality of selectable spreadsheet objects within the spreadsheet;
  in response to receiving the selection of the spreadsheet object, displaying a first user interface within the spreadsheet application, the first user interface including an option to share the spreadsheet object to the network service, wherein the network service is different from the spreadsheet application;
  receiving a selection of the option in the first user interface within the spreadsheet application;

causing, after receiving the selection of the option in the first user interface, display of a second user interface for manipulating default permissions associated with the selected spreadsheet object;
receiving, from the network service, a list of at least one or more users of the network service;
receiving a selection to manipulate the default permissions for the one or more users with respect to the spreadsheet object;
automatically saving the manipulated default permissions to a network share along with the spreadsheet object;
initiating sharing the spreadsheet object with the one or more users of the network service based on the selected option and the manipulated default permissions; and
initiating sending of a notification to the one or more users, through the network service, of the sharing of the spreadsheet object.

2. The method of claim 1, further comprising:
wherein the network share is at a different location from the network service;
wherein saving the manipulated default permissions comprises saving a first list of users having the permission to view the selected spreadsheet object and a second list of users having the permission to view and manipulate the selected spreadsheet object; and
determining when a change is made to the spreadsheet that affects the spreadsheet object after the spreadsheet object is shared with the network service and automatically updating the spreadsheet object on the network service.

3. The method of claim 1, wherein the network service is a social network.

4. The method of claim 1, wherein the network service is at least one of a blog and an Internet site.

5. The method of claim 1, wherein when the at least one sharing option to share the spreadsheet object to the network service is selected, the spreadsheet object is automatically shared to the network service.

6. The method of claim 1, further comprising setting permissions to restrict viewing to only the selected spreadsheet object within the spreadsheet on the network service.

7. The method of claim 2, wherein initiating sharing the spreadsheet object to the network service comprises at least one of: embedding a link to the shared spreadsheet object; embedding a representation of the shared spreadsheet object within a page of the network service.

8. The method of claim 2, wherein the network share further comprises an online service that is configured to interact with spreadsheets.

9. The method of claim 2, wherein an entire spreadsheet workbook that contains the spreadsheet object is saved to the network share.

10. A computer-readable storage device storing computer-executable instructions, that when executed by at least one processor, cause the at least one processor to perform a method for sharing a spreadsheet object that is contained within a spreadsheet to a network service, the method comprising:
receiving, through a spreadsheet application, a selection of the spreadsheet object within the spreadsheet to share on a network service, wherein the selected spreadsheet object is one of a plurality of selectable spreadsheet objects within the spreadsheet;
in response to receiving the selection of the spreadsheet object, displaying a first user interface within the spreadsheet application, the first user interface including an option to share the spreadsheet object to the network service, wherein the network service is different from the spreadsheet application;
receiving a selection of the option in the first user interface within the spreadsheet application;
causing, after receiving the selection of the option in the first user interface, display of a second user interface for manipulating default permissions associated with the selected spreadsheet object;
receiving, from the network service, a list of at least one or more users of the network service;
receiving a selection to manipulate the default permissions for the one or more users with respect to the spreadsheet object;
automatically saving the manipulated default permissions to a network share along with the spreadsheet object;
initiating sharing the spreadsheet object with the one or more users of the network service based on the selected option and the manipulated default permissions; and
initiating sending of a notification to the one or more users, through the network service, of the sharing of the spreadsheet object.

11. The computer-readable storage device of claim 10, further comprising determining when a change is made to the spreadsheet that affects the spreadsheet object after the spreadsheet object is shared with the network service and automatically updating the spreadsheet object on the network service.

12. The computer-readable storage device of claim 10, wherein the network service is at least one of: a blog, a social network, and an Internet site.

13. The computer-readable storage device of claim 10, wherein the first user interface is a context menu that is presented near the selected spreadsheet object.

14. The computer-readable storage device of claim 10, further comprising automatically setting the default permissions to restrict viewing to only the selected spreadsheet object within the spreadsheet on the network service.

15. The computer-readable storage device of claim 10, wherein sharing the spreadsheet object to the network service comprises at least one of: embedding a link to the shared spreadsheet object; embedding a representation of the shared spreadsheet object within a page of the network service.

16. The computer-readable storage device of claim 10, wherein the network share further comprises an online service that is configured to interact with spreadsheets.

17. A system for sharing a spreadsheet object that is contained within a spreadsheet to a network service, comprising:
at least one processor;
memory, operatively connected to the at least one processor and containing instructions that, when executed by the at least one processor, cause the at least one processor to perform a method, the method comprising:
receiving, through a spreadsheet application, a selection of the spreadsheet object within the spreadsheet to share on a network service, wherein the selected spreadsheet object is one of a plurality of selectable spreadsheet objects within the spreadsheet;
in response to receiving the selection of the spreadsheet object, displaying a first user interface within the spreadsheet application, the first user interface including an option to share the spreadsheet object to the network service, wherein the network service is different from the spreadsheet application;
receiving a selection of the option in the first user interface within the spreadsheet application;

causing, after receiving the selection of the option in the first user interface, display of a second user interface for manipulating default permissions associated with the selected spreadsheet object;

receiving a selection to manipulate the default permissions the one or more users with respect to the spreadsheet object;

automatically saving the manipulated default permissions to a network share along with the spreadsheet object;

initiating sharing the spreadsheet object with the one or more users of the network service based on the selected option and the manipulated default permissions; and initiating sending of a notification to the one or more users, through the network service, of the sharing of the spreadsheet object.

18. The system of claim 17, the method further comprising determining when a change is made to the spreadsheet that affects the spreadsheet object after the spreadsheet object is shared with the network service and automatically updating the spreadsheet object on the network service.

19. The system of claim 17, the method further comprising automatically setting the default permissions that restrict viewing to only the selected spreadsheet object within the spreadsheet on the network service and receiving a selection of users that are allowed to interact with the shared spreadsheet object on the network service.

20. The system of claim 17, further comprising an online spreadsheet service that is configured to provide spreadsheet services for interacting with the shared spreadsheet object.

* * * * *